Patented Aug. 28, 1945

2,383,891

UNITED STATES PATENT OFFICE 2,383,891

CEMENT COMPOSITION AND METHOD OF MAKING SAME

Edward W. Scripture, Jr., Shaker Heights, Ohio

No Drawing. Application July 17, 1942,
Serial No. 451,323

19 Claims. (Cl. 106—90)

This invention relates to a cement composition, a composition for grinding cement, and particularly to a method of grinding cement wherein the rate of grinding may be increased with existing equipment.

Hydraulic cements are manufactured by mixing together in a finely divided state, in suitable proportions, either by a wet process or a dry process, suitable raw materials, usually of a calcareous and a silicious nature, to produce after the manufacturing operation chemical compounds having hydraulic and cementitious properties in the desired proportions. The mixed raw materials are heated together in a kiln, in modern practice usually a rotary kiln, and burned at a temperature which causes sintering, or in some cases they may be burned to actual fusion. After burning the resultant product, usually called "clinker," is allowed to cool. In this state of manufacture the cementitious compounds have been formed but exist in a physical state, that of relatively large pieces with very low surface area, in which they cannot be used to make mortar or concrete mixes. This cement clinker is then reduced by grinding, usually in a ball mill of either the intermittent or continuous type, to a relatively fine state of subdivision having a relatively large surface area. During this stage, calcium sulfate in one form or another is usually added to the cement to prevent too rapid set.

The hydraulic properties of the cement depend on its chemical composition and on the burning operation, but also to a considerable extent on the grinding and the degree of fineness to which it has been reduced. For example, the plastic properties and the rate at which the cement hydrates are markedly affected by the surface area, i. e., the degree of grinding.

The grinding of cement clinker requires the use of considerable equipment and consumes a substantial period of time. In order to operate the equipment, power in one form or another is required. The grinding operation, therefore, adds substantially to the cost of manufacture of cement and it will be obvious that the finer the grinding the greater will be this cost.

It has heretofore been known that certain materials when added to cement clinker in the mill will facilitate grinding and will increase the efficiency of this operation. In order to be useful, such materials must not have an adverse effect on the plastic or hydraulic properties of the cement, as by retarding or preventing hydration. It is preferable that such materials, which may be termed "grinding aids," shall improve the properties of the cement and of the mortar or concrete in which they are used with respect to strength, rate of hardening, plasticity, durability, or other properties.

It is an object of this invention to provide a method of producing finely ground cement, wherein the cost of grinding the cement clinker is reduced.

It is another object of this invention to provide a method for grinding cements, wherein the time required to reduce cement clinker to a given surface area is reduced.

It is another object of this invention to provide a method wherein the finer grinding of cement clinker and the production of a cement of greater surface area are facilitated.

It is another object of this invention to provide a ground cement clinker which shall have improved plastic and hydraulic properties.

It is a further object of the present invention to provide an indurating composition for cement.

It is a still further object of the present invention to provide an indurating composition which will improve the properties of concrete, mortar and the like made from hydraulic cement mixes containing pozzolanic materials, accelerating agents, dispersing agents, etc. in suitable amounts.

Some grinding aids heretofore proposed are hygroscopic and when incorporated in the cement in amounts proposed adversely affect the keeping or storing properties of the cement by absorbing moisture from the atmosphere. It is, therefore, another object of the present invention to provide a method for grinding cement wherein the cost of grinding is reduced and whereby the storing or keeping qualities of the cement produced are not impaired.

In my prior application Serial No. 406,904, filed August 14, 1941, and Patent 2,264,336 issued December 2, 1941, I disclosed that certain aromatic compounds, including the substituted benzoic acids, improve a concrete or cement mix when incorporated therein, and when incorporated with cement clinker reduce the grinding time and power required to obtain a cement with a given surface area.

It has now been found that the above objects are also accomplished by incorporating in the cement, and preferably by incorporating with the cement clinker in the grinding mill a relatively small percentage, based on the weight of the cement, of a saturated aliphatic compound, consisting of a carbon-to-carbon chain of at least four carbon atoms and preferably less than twelve carbon atoms. The saturated aliphatic compound has attached to one or more carbon atoms, besides hydrogen, at least one and preferably two hydroxyl groups and at least one primary amino (—NH₂) group. One or more additional groups selected from functional and non-functional groups and including sulfate, sulfonic acid, sulfonate, halogen, nitro, nitroso, and hydroxyl groups may also be present if desired without appreciable deleterious effect on the grinding efficiency of the compound. The chain of carbon atoms may be straight or branched, as desired, and preferably should not substantially exceed twelve carbon atoms.

The compounds I have found to be effective have the general formula $$R\begin{matrix}\nearrow NH_2\\ \searrow OH\end{matrix}$$

where R is a member of the group consisting of alkylene groups having four or more carbon atoms and such alkylene groups having one or more hydrogens substituted by one or more of the functional and the non-functional groups or preferably a member of the group consisting of sulfate, sulfonic acid, sulfonate, halogen, nitro, nitroso, hydroxyl and primary amino groups.

The alkylene groups may have straight or branched chains of the general formula $$-C_mH_{2m}-$$

where $m$ is at least four and preferably less than than twelve. Examples of such groups are:

$$CH_3-CH_2-\underset{|}{CH}-CH_2-$$

$$-CH_2-CH_2-CH_2-CH_2-$$

$$-CH_2-CH_2-CH_2-CH_2-CH_2-$$

$$-CH_2-\underset{|}{CH}-CH_2-$$
$$CH_3$$

$$CH_3-\underset{|}{\underset{CH_3}{C}}-CH_2-\underset{|}{CH}-CH_3$$

etc. In the preferred substituted alkylene groups, one or even more of the hydrogen atoms is substituted by a member of the group consisting of sulfate, sulfonic acid, sulfonate, halogen, nitro, nitroso, hydroxyl and primary amino groups. Preferably, the substituents in the carbon-to-carbon or hydrocarbon chains are separated by carbon atoms having no substituent. Usually in the more desirable compounds there is at least one of the solubilizing substituents present for each five or six carbon atoms.

The hygroscopic properties of the compound depend largely on the number of hydroxyl groups and upon the length of the carbon-to-carbon chain, increasing when the number of hydroxyl groups increases and decreasing when the number of carbon atoms increases. A branched chain compound appears to be less hygroscopic than a straight chain compound of the same length; a branched chain compound also appears more soluble than a straight chain compound of the same number of carbon atoms, hence branched chain compounds are usually preferred. In any case, a chain of at least four carbon atoms is desirable to reduce the hygroscopic properties of the compound, particularly where more than one hydroxyl group is present.

It has been observed that in the grinding of cement clinker the balls, in a ball mill, and the walls of the mill tend to become coated with the more or less finely ground cement. This formation on the grinding surfaces apparently exerts a cushioning effect, such that the rate of grinding is thereby greatly diminished.

Although I do not offer this explanation as a necessary explanation of the results of the present invention, I have found that when small amounts of these chemical compounds are added to cement clinker in a ball mill, the formation of a cushion on the grinding surfaces appears to be reduced and the efficiency of the grinding operation is increased. In this manner the time required, and consequently, the power input, to grind to a particular degree of fineness or surface area is reduced, or for a given time and power input the degree of fineness or surface area is increased.

It may be that the reason these compounds having two or more solubilizing groups offer advantages over compounds having a single solubilizing group is that these two lyophilic groups are adsorbed on the surface of the cement particles. By the adsorption of two groups placed at different points in the molecule the molecule itself would be expected to assume a more or less horizontal position with relation to the cement particles, rather than a more or less vertical position, as might be expected if only a single group were adsorbed. In order to prevent folding of a compound having four or more carbon atoms, it is preferable when only two solubilizing or polar groups are present that at least one such group be attached to carbon atoms intermediate or between the terminal carbon atoms. For the same reason, it is also desirable that the carbon atoms containing solubilizing or polar groups be separated by one or more carbon atoms. In this manner a given amount of the reagent would cover a larger surface area of a cement particle, i. e., a smaller amount would be required to produce a given effect.

The preferred number of solubilizing substituenst depends largely on the length of the chain and upon the number of carbon atoms in the compound, increasing when the number of carbon atoms or the chain length are increased.

It would appear very desirable that the amount of a grinding aid added to the cement clinker should be as small as is consistent with effective results. Possibly this amount is the amount required to form an adsorbed layer one molecule thick. If a layer of considerable thickness is built up on the cement particles, it would be expected that this layer would interfere with the subsequent reactions of the cement. With any hygroscopic substance a relatively thick layer on the cement particles would tend to take up a large amount of water, and thus impair the keeping qualities of the cement, and which would become partially hydrated during storage. With a very small amount of hygroscopic compound this effect would not be appreciably injurious.

Where the compound used as grinding aid is held to the cement particles in a more or less horizontal position, rather than in a vertical or folded position, the thickness of the layer required will be markedly less. It may be surmised that, beyond a complete coverage of the surfaces of the cement particles, further improvement in grinding qualities will be negligible.

The following compounds are examples of those included by the above general formula and found to be effective in accomplishing the objects of the present invention:

2 amino 2 methyl 1,3 propanediol;
2 amino 2 ethyl 1,3 propanediol;
2 amino 2 methyl 1 propanol;
2 amino 1 butanol; and
Tris (hydroxymethyl) aminomethane.

The saving in grinding time depends to a large extent both on the quantity of the above described compounds, which are present in the cement, and on the degree of fineness desired in the cement. With an increase in quantity of the above described compounds added to the mill from effective amounts, such as about .005%, based on the weight of the cement, up to about .05% or .1%, an increase in the efficiency in grinding time may be had. Although as much as .3% to .5% of the above compounds may be incorporated with the cement clinker, appreciable further improvement in results is not obtained and unless the proportion of hydroxyl groups to carbon atoms is less than one-half, the hygroscopicity may be troublesome even though four or more carbon atoms are present in the compounds. It is generally preferable to use less than .05%, such as .045%, of the addition as most of the benefits are obtained with a saving in cost. When the cement is ground to a greater surface area, the saving in the grinding time over processes of the prior art is substantially increased.

The following example illustrates the effect of the compounds of the above general formula in reducing the grinding time or in increasing the surface area of the cement:

Example 1

Several separate batches of the same amount of identical cement clinker were separately ground for two hours in the same cement mill. One batch served as a control and contained no organic addition. The surface areas of the cements produced and the additions are indicated in the following table:

| Batch No. | Addition | Surface area |
|---|---|---|
|  |  | Sq. cm./gr. |
| 1 | None | 1,550 |
| 2 | .045% 2 amino 2 methyl 1,3 propanediol | 1,920 |
| 3 | .045% 2 amino 2 ethyl 1,3 propanediol | 1,894 |

I prefer to use a proportion of the above compound less than .05% of the weight of the cement, but a proportion up to .1% is not injurious. The beneficial effects of this invention are not secured unless an appreciable amount of the compound, say .005% is used.

The above compounds far from having a deleterious effect improves the properties of concrete structures prepared from cement containing one or more of them in admixtures therewith.

The following example illustrates the improvement of concrete or mortar mixes by the addition of compounds embodying the present invention:

Example 2

Identical mortar mixes were prepared from each of the batches of cement obtained in Example 1. The concentration of the cement in each instance was equivalent to five sacks of cement per cubic yard of mortar. Each of the mixes contained sufficient water to produce a three inch slump. The compressive strengths of 6" x 12" concrete cylinders cast from the cement mixes and cured under identical conditions for the indicated periods, are as follows:

| Batch No. | Addition | Compressive strength | | | |
|---|---|---|---|---|---|
|  |  | 1 day | 3 days | 7 days | 28 days |
| 1 | None | 515 | 1,340 | 1,980 | 2,810 |
| 2 | .045% 2 amino 2 methyl 1,3 propanediol | 670 | 1,980 | 2,950 | 3,745 |
| 3 | .045% 2 amino 2 ethyl 1,3 propanediol | 815 | 2,260 | 3,160 | 4,030 |

It is preferred to incorporate the compounds included by the above designated general formula into the cement during the grinding operation. It has been found that when they were thus incorporated, greater improvement in the cement may be obtained. However, a substantial improvement in the cement or concrete mix may be had when the above compounds are added to the ground cement at later stages.

Cement dispersing agents, such as active ingredients of waste sulphite liquor, naphthalene sulfonic acids, wetting agents, such as lauryl sodium sulfate and other alkali metal sulfates or sulfonates, and accelerators, such as calcium chloride and other metal chlorides or electrolytes, for increasing the rate of hardening or setting of the cement, pozzolanic materials, etc. may, of course, also be incorporated in the cement mix, if desired. One or more of the above organic compounds may also be mixed with suitable amounts of an accelerator, such as calcium chloride, and/or cement dispersing and/or wetting agents. While calcium chloride or other hygroscopic compounds may be added to the cement at the time of use, it is not usually desirable to add such hygroscopic substances to the clinker before or during grinding, as the keeping qualities of the cement produced would be reduced. A particularly desirable mixture for addition to cement may contain the solid constituents of waste sulphite liquor or other cement dispersing agent, and calcium chloride, with the ingredients proportioned to give in a cement mix .005% to .1% on the weight of the cement of one or more of the compounds included by the above general formula, .001% to .5% of the solid constituents of a cement dispersing agent such as waste sulphite liquor residue, and the usual amounts, such as up to 2%, of calcium chloride. If desired, the waste sulphite liquor may be substituted by other cement dispersing agents, or even wetting agents, such as lauryl sodium sulfate. Waste sulphite liquor or the dried residue thereof contains water-soluble, active ingredients which function to disperse cement particles in water. While the whole waste sulphite liquor, or the dried residue thereof, which is more conveniently handled, may be used, the cement dispersing components of the liquor or residue may be substituted, if desired. In referring to the solid constituents of waste sulphite liquor this expression is used to designate one or more of the active ingredients thereof, either dry or in water.

It will be apparent that a compound which facilitates grinding may be added to the cement clinker in its natural physical form or in solution, or in any other physical form. It will also be apparent that more or less of the usual amount of gypsum or other form of calcium sulfate may be added, depending on the desired characteristics of the cement, and that other substances may be added to the cement at the same time, or subsequently.

Furthermore it is to be understood that the particular form of product shown and described and the particular procedure set forth are presented for purposes of explanation and illustration, and that various modifications of said product and procedure can be made without departing from my invention as defined in the appended claims.

What I claim is:
1. In the process of grinding cement clinker, the step which comprises grinding the clinker in the presence of about .005% to about .1%, based on the weight of the cement, of 2 amino 2 methyl 1,3 propanediol.

2. A dry cement comprising about .005% to about .1%, based on the weight of the cement, of 2 amino 2 methyl 1,3 propanediol.

3. In the process of grinding cement clinker, the step which comprises grinding the clinker in the presence of about .005% to about .1%, based on the weight of the cement, of 2 amino 2 ethyl 1,3 propanediol.

4. A dry cement comprising about .005% to about .1%, based on the weight of the cement, of 2 amino 2 ethyl 1,3 propanediol.

5. In the process of grinding cement clinker, the step which comprises grinding the cement clinker in the presence of a small amount of an aliphatic amino alcohol consisting of carbon-to-carbon chain of at least four and not substantially more than twelve carbon atoms and consisting of carbon, hydroxyl, hydrogen, and one primary amino group.

6. In the process of grinding cement clinker, the step which comprises grinding the clinker in the presence of from about .005% to about .1% based on the weight of the cement, of an aliphatic compound of the general formula R—NH$_2$, where R is an aliphatic chain of at least four and not substantially more than twelve carbon atoms consisting of carbon, hydrogen and hydroxyl.

7. In the process of grinding cement clinker, the step which comprises grinding the clinker in the presence of from about .005% to about .1%, based on the weight of the cement, of an aliphatic compound of the general formula

where R is an aliphatic chain of four to twelve carbon atoms consisting of carbon, hydrogen and one hydroxyl group.

8. In the process of grinding cement clinker, the step which comprises grinding the clinker in the presence of from about .005% to about .1%, based on the weight of the cement, of an aliphatic compound of the general formula

where R is a saturated aliphatic carbon to carbon chain of at least four and not substantially more than twelve carbon atoms, and consisting of carbon and hydrogen.

9. In the process of grinding cement clinker, the step which comprises grinding the clinker in the presence of from about .005% to about .1%, based on the weight of the cement, of an aliphatic compound of the general formula

where R is an aliphatic group consisting of a carbon-to-carbon chain, hydrogen, and one hydroxy group.

10. A dry cement comprising about .005% to about .1% based on the weight of the cement, of an aliphatic amino alcohol consisting of a carbon-to-carbon chain of at least four and not substantially more than twelve carbon atoms and consisting of carbon, hydrogen, hydroxyl and one primary amino group.

11. A dry cement comprising about .005% to about .1% based on the weight of the cement, of an aliphatic compound of the general formula R—NH$_2$, where R is an aliphatic chain consisting of carbon hydroxyl and hydrogen.

12. A dry cement comprising about .005% to about .1% based on the weight of the cement, of an aliphatic compound of the general formula

where R is an aliphatic chain consisting of carbon, hydrogen and one hydroxyl group.

13. A concrete or mortar mix comprising sand, aggregate, an hydraulic cement and a small amount of an aliphatic compound, having a carbon-to-carbon chain of at least four and not substantially more than twelve carbon atoms and consisting of carbon, hydrogen, hydroxyl and one primary amino group.

14. A concrete or mortar mix comprising sand, aggregate, an hydraulic cement and a small amount of an aliphatic compound of the general formula R—NH$_2$, where R is an aliphatic chain consisting of carbon, hydrogen and hydroxyl.

15. A concrete or mortar mix comprising sand, aggregate, an hydraulic cement and a small amount of an aliphatic compound of the general formula

where R is an aliphatic chain consisting of carbon, hydrogen and one hydroxyl group.

16. An indurating composition for addition to cement comprising a cement dispersing agent consisting of active ingredients of waste sulphite liquor and an aliphatic amino alcohol, consisting of a carbon-to-carbon chain of at least four and not substantially more than twelve carbon atoms, and consisting of carbon, hydrogen, hydroxyl and one primary amino group, said aliphatic alcohol and said dispersing agent being proportioned to give in a cement mix .005% to .1%, based on the weight of the cement, of said aliphatic alcohol and at the same time .001% to .5% based on the weight of the cement, of said cement dispersing agent.

17. An indurating composition for addition to cement comprising a cement dispersing agent consisting of active ingredients of waste sulphite liquor and an aliphatic compound of the general formula R—NH$_2$, where R is an aliphatic chain consisting of carbon, hydroxyl and hydrogen, said aliphatic compound and said dispersing agent being proportioned to give in a cement mix .005% to .1%, based on the weight of the cement, of said aliphatic compound and at the same time .001% to .5%, based on the weight of the cement, of said cement dispersing agent.

18. An indurating composition for addition to cement comprising a cement dispersing agent consisting of active ingredients of waste sulphite liquor and an aliphatic compound of the general formula

where R is an aliphatic chain consisting of carbon, hydrogen and one hydroxyl group, said aliphatic compound and said dispersing agent being proportioned to give in a cement mix .005% to .1%, based on the weight of the cement, of said aliphatic compound and at the same time .001% to .5%, based on the weight of the cement, of said cement dispersing agent.

19. An indurating composition for addition to cement comprising solid active constituents of waste sulphite liquor and an aliphatic primary amino alcohol, consisting of a carbon-to-carbon chain at least four and not substantially more than twelve carbon atoms, and consisting of carbon, hydroxyl, hydrogen and one primary amino group, said aliphatic alcohol and said waste sulphite liquor being proportioned to give in a cement mix .005% to .1% based on the weight of the cement, of said aliphatic alcohol and at the same time .001% to .5%, based on the weight of the cement, of said solid active constituents.

EDWARD W. SCRIPTURE, Jr.